C. S. NYBERG.
MACHINE FOR PASTING THE INNER BOXES OR SLIDES OF MATCH BOXES.
APPLICATION FILED OCT. 19, 1906.
943,158.
Patented Dec. 14, 1909.
6 SHEETS—SHEET 1.
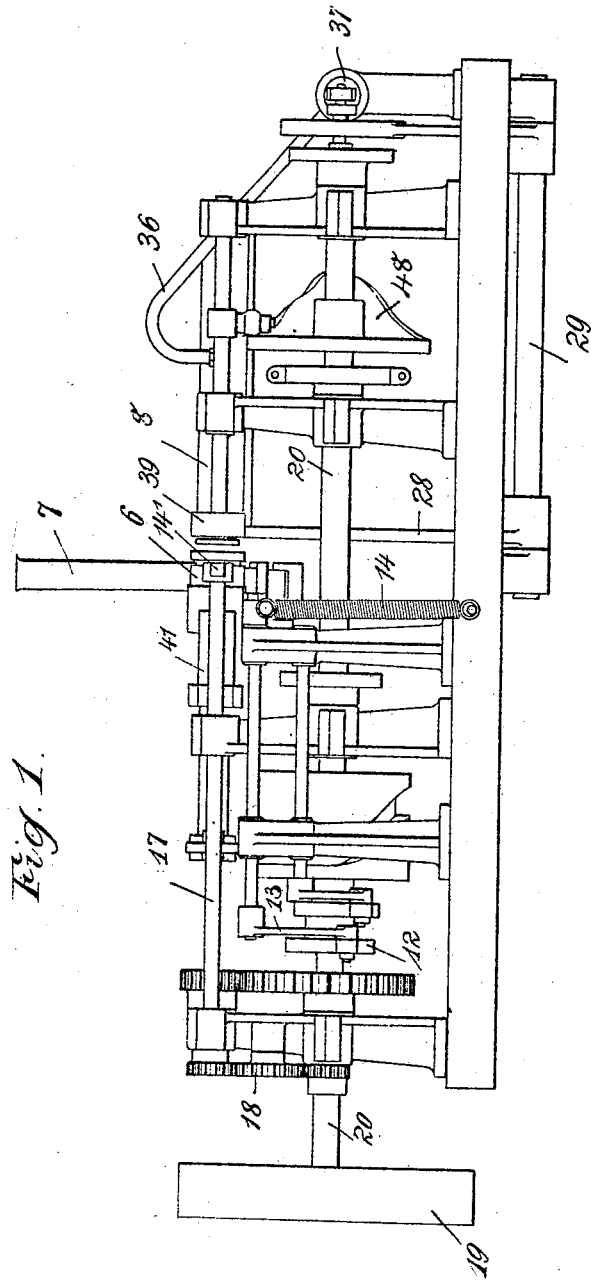

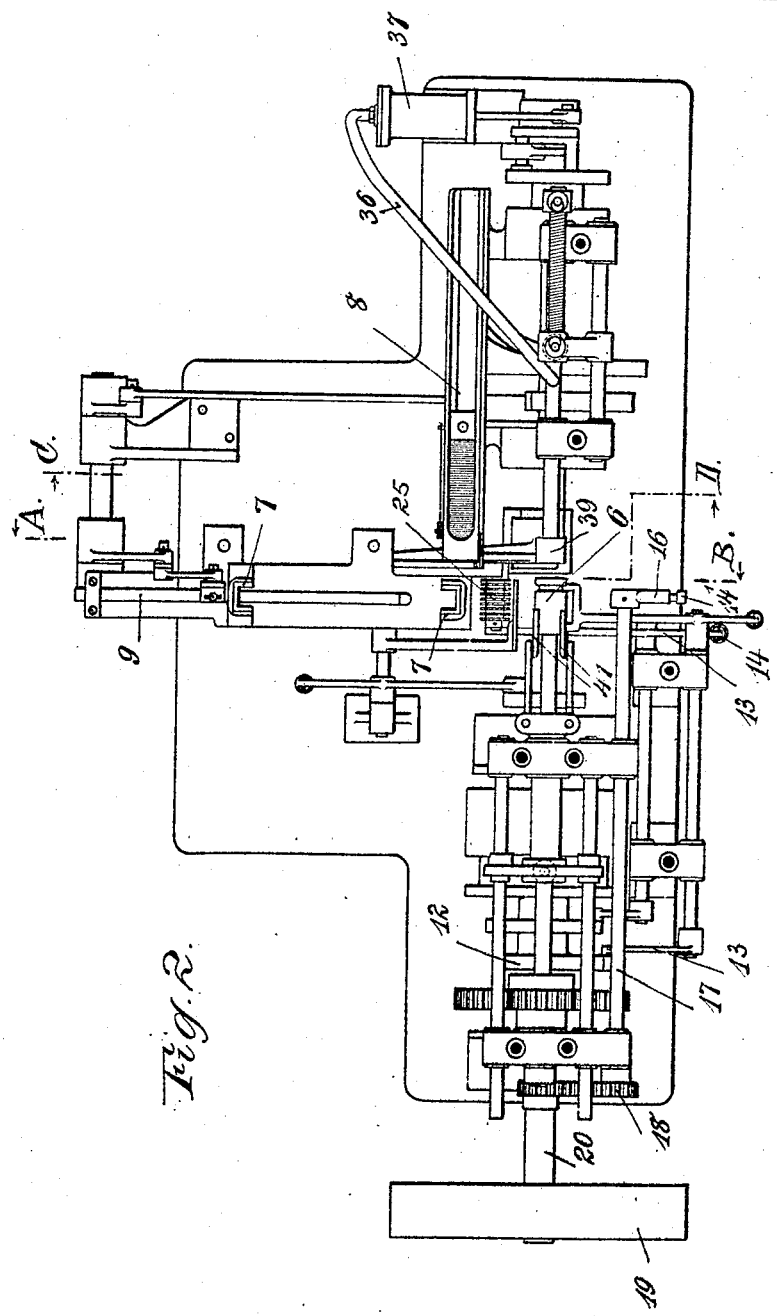

C. S. NYBERG.
MACHINE FOR PASTING THE INNER BOXES OR SLIDES OF MATCH BOXES.
APPLICATION FILED OCT. 19, 1906.
943,158.
Patented Dec. 14, 1909.
6 SHEETS—SHEET 3.
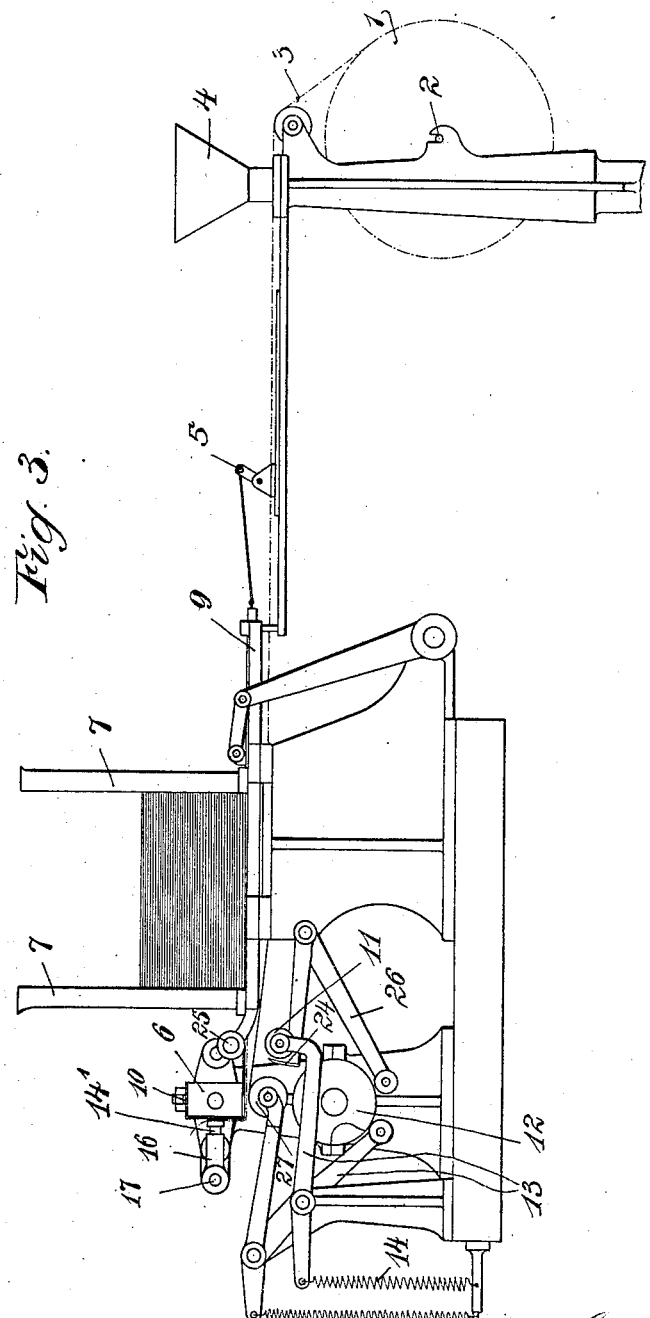

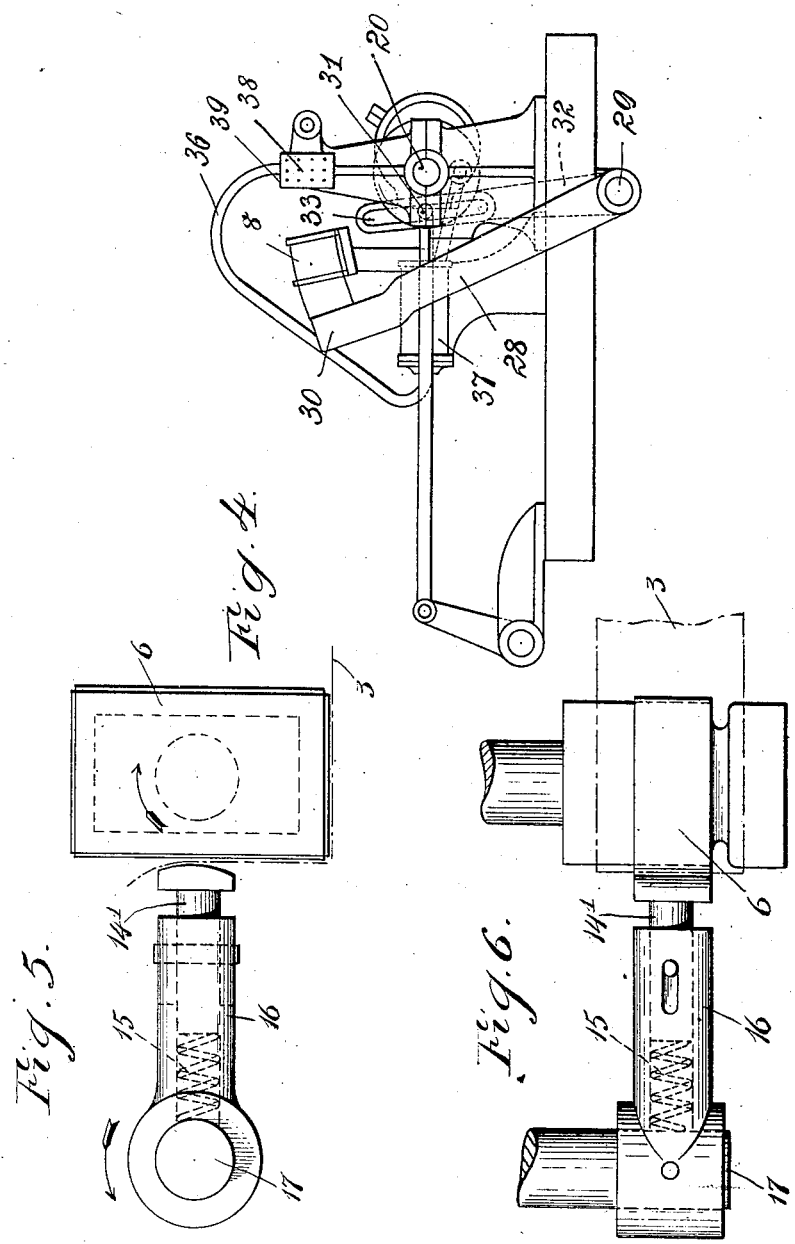

C. S. NYBERG.
MACHINE FOR PASTING THE INNER BOXES OR SLIDES OF MATCH BOXES.
APPLICATION FILED OCT. 19, 1906.
943,158.
Patented Dec. 14, 1909.
6 SHEETS—SHEET 5.
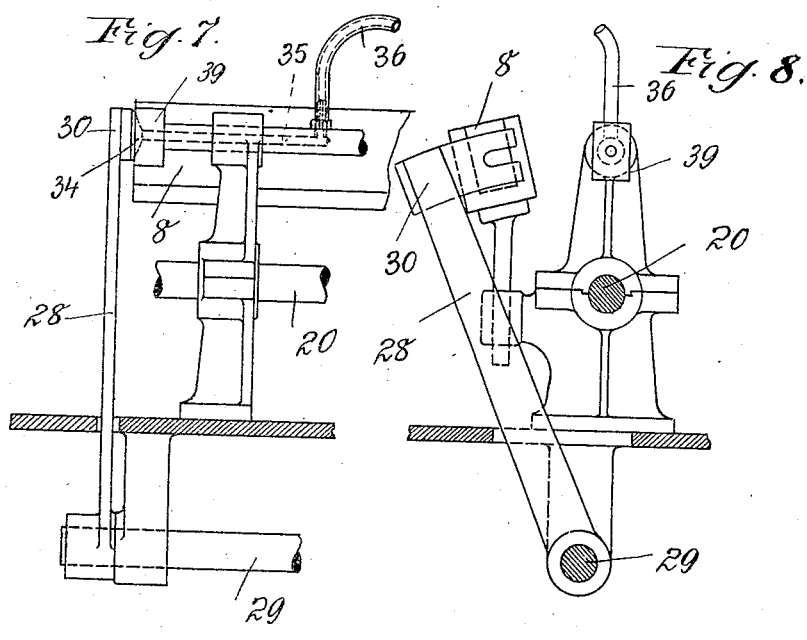
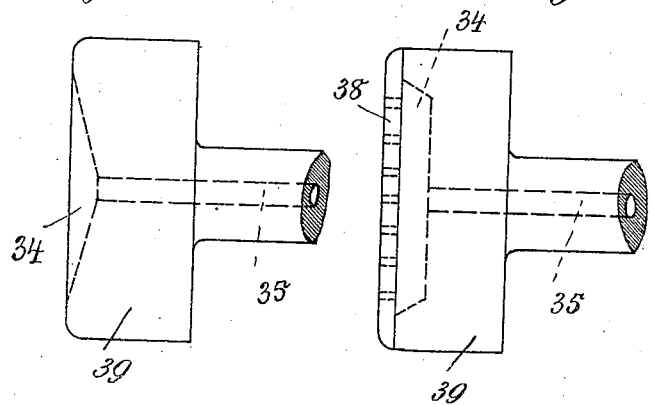
Witnesses
Inventor
Carl Sigfrid Nyberg
By
Attorneys C. S. NYBERG.
MACHINE FOR PASTING THE INNER BOXES OR SLIDES OF MATCH BOXES.
APPLICATION FILED OCT. 19, 1906.
943,158.
Patented Dec. 14, 1909.
6 SHEETS—SHEET 6.
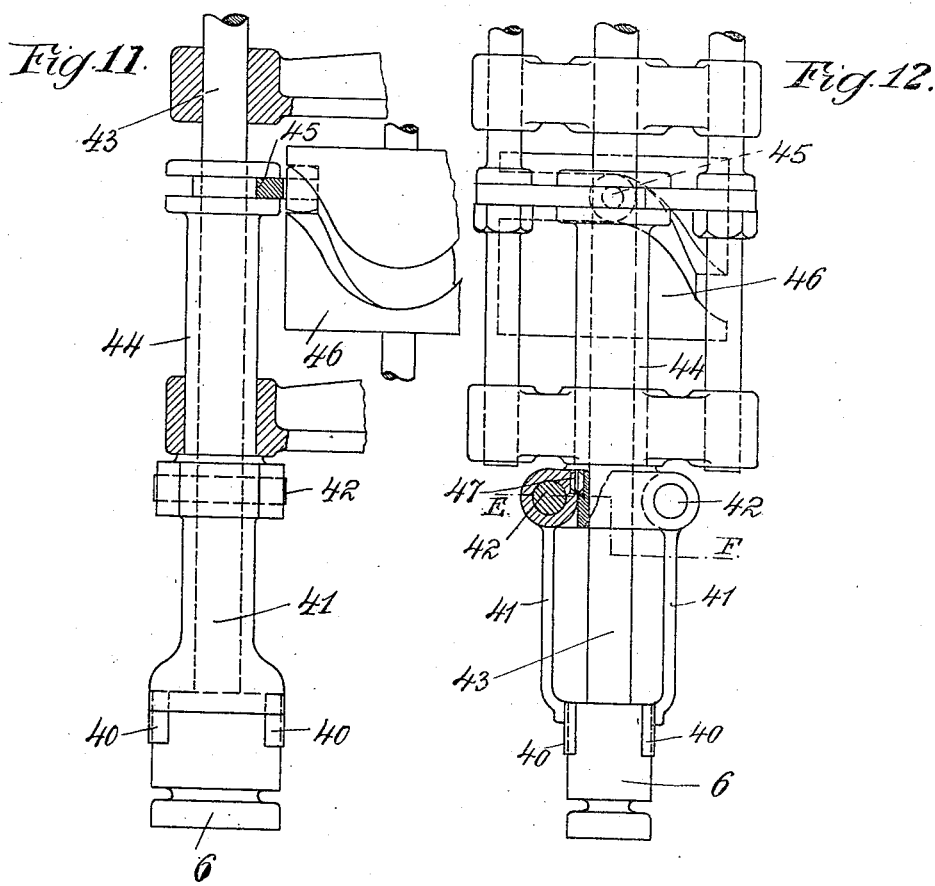
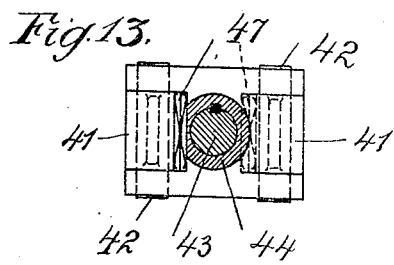

UNITED STATES PATENT OFFICE.

CARL SIGFRID NYBERG, OF MARIEDAL, SÖDERTELJE, SWEDEN, ASSIGNOR TO BADISCHE MASCHINENFABRIK & EISENGIESSEREI VORM. G. SEBOLD UND SEBOLD & NEFF, OF DURLACH, GERMANY, A CORPORATION.

MACHINE FOR PASTING THE INNER BOXES OR SLIDES OF MATCH-BOXES.

943,158.      Specification of Letters Patent.      Patented Dec. 14, 1909.

Application filed October 19, 1906. Serial No. 339,735.

*To all whom it may concern:*

Be it known that I, CARL SIGFRID NYBERG, engineer, and resident of Mariedal, Södertelje, Kingdom of Sweden, have invented new and useful Improvements in Machines for Pasting the Inner Boxes or Slides of Match-Boxes, of which the following is a specification.

As is well known, the slides of match boxes are made of previously cut and scored side and bottom chips together with paper drawn from a roll by coiling the side chips upon a rotary mandrel and winding the paper strip (previously coated with a uniform coat of paste) around the same, and then inserting the bottom chip and pasting the projecting portion of the paper over this bottom.

The machine which forms the subject of the present invention comprises a number of improvements which render it better and more efficient than other machines of the same type previously constructed. First, a device is provided for pasting the ends of the paper firmly after they have been wound around the side chip in the manufacture of the slides. This device consists of a presser-head which rolls under pressure without (or with but slight) friction over the slide so as to effect the pressing-on of the ends of the paper. For the purpose of feeding the bottoms there has been employed hitherto a rectilinearly moved slide which by means of a projection takes the bottom chips one by one from the end of the receptacle containing said chips and conveys them in a straight row to the point required. The improved machine has been simplified in this respect insofar as a lever pivoted at a fixed point is used instead of the slider, and the holding of the bottom firmly in place against the coiling mandrel is effected by means of a vacuum. Finally, there is also provided a device, consisting of two spring arms for the purpose of pushing the slides off the mandrel. Hitherto the slides have been pushed off by means of a suitably recessed plate which, however, after long use, does not fit against the mandrel with the requisite accuracy.

In the accompanying drawings, which illustrate the construction of the improved machine, Figures 1 to 4 show the whole machine, while Figs. 5 to 13 show details thereof on a larger scale. Fig. 1 is a front elevation; Fig. 2 the corresponding plan; Fig. 3 a section on line A—B of Fig. 2 and Fig. 4 a section on line C—D of Fig. 2. Figs 5 and 6 show on a larger scale, in elevation and plan respectively, the device for pressing up the end of the paper. Figs. 7 and 8 are respectively a side and front elevation of the device for feeding the box bottoms. Fig. 9 shows the head of the mandrel with the recess wherein the vacuum is produced. Fig. 10 is a second modification of this head. Figs. 11 and 12 show, in two views at right angles to each other, the device for stripping the slide from the mandrel. Fig. 13 is a section on line E—F of Fig. 12.

The paper roller 1, carrying an endless strip of paper, is journaled at 2, and from it the paper strip 3 passes, through the pasting apparatus 4, to the mechanism 5 which feeds the paper toward the coiling mandrel 6. During this movement the pasting apparatus 4 coats the upper side of the paper strip with a uniform coat of paste. The mandrel 6 is angular and mounted to rotate.

The previously cut and scored side chips are stacked in the storage receptacle 7, while the cut bottom chips are placed in the receptacle 8. A slide 9 takes a side chip from the storage receptacle 7, at every revolution of the machine, and feeds it to the coiling mandrel 6 where it is held by a flat spring 10. Then the coiling mandrel 6 rotates and the roller 11 moves upward to press the paste-bearing side of the paper strip 3 against the side chip which is being coiled ar ⸺d the mandrel. The pressing roller 11 is operated by a cam 12 through the medium of the bel' crank lever 13 under the influence of the spring 14. By the side of the mandrel is provided a presser head 14¹, which is mounted elastically, by means of a spring 15, in a bolt 16 and rotates with the latter around the shaft 17, Figs. 5 and 6. The shaft 17 which forms a pivot for said presser head receives its motion through toothed wheels 18 from the main shaft 20 of the machine, which is provided with the belt pulley 19, Figs. 1 and 2. The mandrel 6 which carries the slide, is rotated at a corresponding speed so that the presser head rolls under spring pressure over the track where the paper is to be pasted on. The rotation of the presser-head and of the mandrel takes place in the directions indicated by the arrows. The said presser-head prevents the paper from slipping on the chip while the paper is being pasted on the chip, because said head presses the front edge of the paper well against the chip. A cutter 24 and a comb-like roller 25 are provided for the purpose of cutting off the paper. For this purpose the cutter is operated concurrently with the circular cam 12 by means of the lever 26. The roller 27 presses the cut-off end of the paper against the chip.

The bottom of the slide is inserted by means of a lever 28 which can rotate with the shaft 29 which forms a pivot for said lever (Figs. 4, 7 and 8). The head 30 of the lever is formed as a sector of a circle and has on its plane end surface a prominence or tooth of the thickness of the bottom chip, so that each time it passes by the receptacle 8 containing the bottom chips, it carries forward with it a chip and feeds the latter to the coiling mandrel 6 where the side piece of the slide is already located. The movement of the lever 28 is effected by means of a crank pin 31 which is mounted on the main shaft 20 of the machine and which projects through a slot 33 in a lever 32, also mounted on the shaft 29.

The holding of the bottom (which has been taken from the receptacle 8 in the manner just described) in front of the coiling mandrel, is effected by means of the head of a plunger 39 which is situated opposite the coiling mandrel 6, and which, as shown at 34 in Fig. 9, is slightly recessed. The recess is connected, by a duct 35 and by the pipe 36, with an air pump 37 likewise driven from the main shaft (Figs. 2 and 4). The recess 34 may, as shown in Fig. 10, be closed in front by a perforated plate 38. The air pump produces a vacuum in the recess 34, so that the bottom of the slide is held (as long as necessary) on the plunger 39. The finished side piece of the slide is thereafter slipped off the coiling mandrel 6 and on to the plunger 39, and thus the bottom is brought into its proper position relatively to the slide. This slipping movement is effected by means of two spring push-plates 40 of angular shape mounted on the tongs-legs 41, which latter are pivoted at 42. The pivot pins 42 are mounted on a sleeve 44 which is capable of sliding on the shaft 43 of the mandrel 6; this sleeve being moved to and fro by a carrier 45 actuated by the circular cam 46. The plates 40 are caused to bear constantly with slight pressure against the corners of the mandrel 6 by the action of springs 47 which press against a shoulder of the pivot head of the arms 41 (Figs. 11-13). The withdrawal of the plunger 39, after the ends of the paper have been struck up and pasted to the bottom, is effected by means of a circular cam 48, Fig. 1.

The operation of the machine is as follows. The slide 9 takes from the storage receptacle 7 a finished, scored, side chip and feeds it to the coiling mandrel 6 where it is held by the spring 10, at the same time the end of the strip of paper 3 coming from the paper roll 1, and coated with paste on its upper side by passing through the pasting apparatus 4, is pressed by the press roller 11 against the side chip and pasted firmly against the latter, whereupon, during the rotation of the mandrel 6, the pasting of the paper strip around the chip is effected by the presser-head 14' and the roller 27. Thereafter the cutter 24 cuts off the strip, and the roller 27 presses the cut-off end of the latter against the chip, so that the side portions of the slide are thus finished. The lever 28 then takes from the receptacle 8 a bottom and feeds it in front of the plunger 39, where it is held by the vacuum produced by the air pump 37 in the recess 34. Thereupon the strippers 40 push the slide on to the oppositely situated plunger 39, and the ends of the paper are struck up against the bottom and pasted in the usual manner. The plunger 39 is then drawn back by the cam 48 and the finished slide is removed from the mandrel, and ejected, whereupon the series of operations is repeated.

Now what I claim and desire to secure by Letters Patent is the following:

1. In a machine for making box parts such as the slides of match-boxes, the combination of an angular mandrel, means for feeding side chips to said mandrel, the presser-head arranged to coöperate with the mandrel, said presser-head comprising a piston with a rounded outer end, a bolt or socket with which said piston has a sliding engagement, a spring for pressing said piston outward from said socket and toward the mandrel, and means for fastening the bottom of the slide.

2. In a machine for making box parts such as the slides of match-boxes, a mandrel, means for forming the slide thereon, a reciprocating sleeve, spring arms mounted on opposite sides of said sleeve, and angular plates located at the ends of said arms and adapted to remove the slide from the mandrel.

3. In a machine for making box parts such as the slides of match-boxes, a mandrel, means for forming the slide thereon, a reciprocating member, arms carried by said member to reciprocate in unison therewith and adapted to remove the slide from the mandrel said arms being also movable transversely relatively to said member, and 5 springs for pressing said arms toward each other.

In testimony, that I claim the foregoing as my invention, I have signed my name in presence of two witnesses, this 3 day of October 1906.

CARL SIGFRID NYBERG.

Witnesses:
 CARL FRIBERG,
 HANS B. OPESSON.